United States Patent [19]

Suzuki

[11] Patent Number: 5,255,121
[45] Date of Patent: Oct. 19, 1993

[54] ULTRA-WIDE FIELD EYEPIECE FOR MICROSCOPES

[75] Inventor: Toshinobu Suzuki, Tokyo, Japan

[73] Assignee: Olympus Optical Co., Ltd., Tokyo, Japan

[21] Appl. No.: 965,431

[22] Filed: Oct. 23, 1992

[30] Foreign Application Priority Data

Oct. 24, 1991 [JP] Japan .................. 3-277612

[51] Int. Cl.$^5$ .................. G02B 25/04; G02B 9/60; G02B 9/62
[52] U.S. Cl. .................. 359/643; 359/761; 359/770
[58] Field of Search .............. 359/642, 643, 755, 761, 359/770, 358, 656, 657, 658, 659

[56] References Cited

U.S. PATENT DOCUMENTS

| 4,720,183 | 1/1988 | Dilworth | 359/643 |
| 4,747,675 | 5/1988 | Nagler | 359/643 |

FOREIGN PATENT DOCUMENTS

| 263606A1 | 1/1989 | German Democratic Rep. | 359/643 |
| 49-69148 | 7/1974 | Japan. | |
| 60-57315 | 4/1985 | Japan. | |
| 2-222914 | 9/1990 | Japan. | |
| 3-87805 | 4/1991 | Japan. | |

*Primary Examiner*—Bruce Y. Arnold
*Assistant Examiner*—David R. Parsons
*Attorney, Agent, or Firm*—Cushman, Darby & Cushman

[57] ABSTRACT

The invention provides an ultra-wide field eyepiece for microscopes, in which such off-axial aberrations as the curvature of field, astigmatism and coma are well-enough corrected at a field number as large, as 26.5, and in which the flatness of the image surface is degraded even when the entrance pupil position varies, and which comprises, in order from the entrance side, a first lens unit G1 of negative refracting power, a second lens unit G2 of positive refracting power, a third lens unit G3 of negative refracting power, a fourth lens unit G4 of positive refracting power and a fifth lens unit G5 of positive refracting power with the surface having a stronger curvature facing the entrance side, said third to fifth lens units being located in the rear of an intermediate image plane.

8 Claims, 6 Drawing Sheets

ULTRA-WIDE FIELD EYEPIECE FOR MICROSCOPES

BACKGROUND OF THE INVENTION

The present invention relates to an ultra-wide field eyepiece for microscopes.

An eyepiece is a sort of loupe, and so has often a simple structure that generally comprises a combination of convex lenses. For this reason, the Petzval's sum assumes a positive value so large that some curvature of field often remains with an increased distortion. In an optical microscope system, the curvature of field is set off by inclining images formed by the objective and eyepiece in opposite directions, thereby achieving a flat image. However, the inclinations of the images are not well corrected. In order to ward off this, reliance is generally placed on some procedure in which the mean image surface of the meridional and sagittal image surfaces is made upright-enough to eliminate the curvature of field.

So far, this procedure, for instance, has been embodied by a lens system set forth in Japanese Provisional Patent Publication No. 60-57315. To be more specific, this system is an external focus type of eyepiece that comprises four lens units, say, in order from the incident side, a positive lens, a negative lens, a positive lens and a positive lens. This eyepiece has a field number as wide as 20 with well-corrected curvature of field, coma, distortion and other aberrations.

Another conventional example of the lens system whose astigmatism is again reduced by erecting the mean image surface is disclosed in Japanese Provisional Patent Publication No. 2-222914. This lens system is an external-focus type of eyepiece that comprises, in order from the incident side, a first lens unit of positive or negative refracting power and a second lens unit of positive refracting power. As in the case of the first example, this lens has a field number as large as 20 with well-corrected aberrations.

Conventional examples similar in lens arrangement to the present invention are set forth in Japanese Provisional Patent Publication No. 3-87805 and Japanese Provisional Patent Publication No. 49-69148. First, the lens arrangement described in Japanese Provisional Patent Publication No. 3-87805 is directed to an eyepiece lens for telescopes that comprises, in order from the incident side, a diverging lens element, a converging lens element and a multi-lens type of converging element located through an intermediate image plane. Japanese Provisional Patent Publication No. 49-69148, on the other hand, relates to an internal focus type of eyepiece for microscopes that comprises five lens units, say, in order from the incident side, a positive lens and a negative lens, a positive lens, a positive lens and a positive lens, the last four lenses located in the rear of an intermediate image plane While the eyepiece of Japanese Provisional Patent Publication No. 60-57315 is excellent in the flatness of the image surface, some astigmatism remains in the vicinity of the maximum image height having a field number of 20. Moreover, it is of course that the flatness of the image surface gets worse as the field number increases.

The lens system of Japanese Provisional Patent Publication No. 2-222914 is improved in terms of astigmatism, but leaves coma intact. Moreover, the flatness of the image surface gets worse as the field number increases.

The lens system of Japanese Provisional Patent Publication No. 3-87805 cannot stand comparison with an eyepiece for microscopes, because it is an eyepiece for telescopes and so is different from the eyepiece for microscopes in terms of to what degree aberrations are to be corrected.

In addition, the eyepiece for telescopes of Japanese Provisional Patent Publication No. 49-69148 is very unfavorable in terms of coma in the vicinity of the field of view.

As described above, there has not been an eyepiece that is improved in terms of such off-axial aberrations as the curvature of field, astigmatism and coma in an ultra-wide field level that refers to a field of view having a field number of the order of 26.5 until the present invention. Even though a large inclination of the image formed by an eyepiece is set off by the inclination of the image formed by an objective, such a large inclination of the image cannot be well corrected and so is likely to remain. Further, when the meridional image surface is erected so as to correct the inclination of the image, the meridional surface separates from the sagittal surface, leaving some considerable astigmatism intact and giving rise to an image of inferior quality. Still further, when an eyepiece is used in combination with an objective having a large numerical aperture on the exit side, it is impossible to obtain an image of good quality if coma cannot be corrected completely at a place having a large numerical aperture.

When coma remains in the eyepiece, the flatness of the image surface gets worse due to the fact that the exit pupil position varies for each objective or that even with a single objective, the exit pupil position varies by the insertion of an intermediate tube in the rear of the objective.

SUMMARY OF THE INVENTION

In view of such situations as mentioned above, an object of the invention is to provide an ultra-wide field eyepiece for microscope which overcomes the defects of the prior art mentioned above, and so is well-enough corrected in terms of off-axial aberrations, e.g., the curvature of field, astigmatism and coma in an ultra-wide field having a field number of the order of 26.5 and in which the flatness of the image surface is not deteriorated even by a variation in the entrance pupil position that is caused by an objective or the insertion of an intermediate tube.

According to the present invention, the object mentioned above is achieved by the provision of an ultra-wide field eyepiece for microscopes comprising a first lens unit of negative refracting power and a second lens unit of positive refracting power which are located on the entrance side of an intermediate image plane, a third lens unit of negative refracting power, a fourth lens unit of positive refracting power and a fifth lens unit with the surface having a stronger curvature facing the entrance side, which are located on the exit side of said intermediate image plane.

In the following description, why the arrangement mentioned above is adopted and how it works will be explained.

In order to reduce the curvature of field and astigmatism, it is required to reduce the Petzval's sum. To this end, a negative lens is incorporated in the third lens unit. In other words, the negative lens is located from the objective image position (intermediate image position) toward the eye side to raise the height of ray. The raised height of ray is gradually lowered by the positive refracting power of the fourth lens unit. Finally, the light is converged on the eyepoint by the fifth lens unit of positive refracting power, with the surface having a stronger curvature facing the incident side.

The first and second lens units are located in front of the objective image position so as to correct coma well-enough. In the case of the external focus type of lens arrangement or, in other words, in case lens units are located from the objective image position toward the eye alone, the optical system is made so asymmetric that it is difficult to correct coma well in an ultra-wide field. Thus, the coma can be well corrected by the incorporation of negative and positive refracting powers in the first and second lens units, respectively. The upper marginal light ray in front of the objective image position is converted to the lower marginal light ray in the rear of the objective image position. The lower marginal light ray in front of the objective image, by contrast, is converted to the upper marginal light ray in the rear of the objective image. The coma of the eyepiece as a whole can be well corrected in a well-balanced state by making use of the design that the heights of the upper and lower rays with respect to the principal ray are reversed around the objective image position or, more specifically, locating the two, negative and positive, lens units.

In order to correct coma more satisfactorily, it is desired that a negative meniscus lens convex on the incident side be incorporated in the first lens unit and a positive lens convex on the eye side in the second lens unit. More preferably, this positive lens should be a positive meniscus lens. The off-axial luminous flux incident on the first lens unit is lowered in height by the thickness of the first lens unit, thereby allowing the negative power of the rear surface of the first lens unit to serve effectively. The luminous flux can then be smoothly directed to the eye lens through the positive lens of the second lens unit that is convex on the eye side.

Now let $f_{12}$ and $f$ denote the composite focal length of the first and second lens unit and the focal length of the total system, respectively. Then, if the following condition (1):

$$|f/f_{12}| < 0.3 \tag{1}$$

is satisfied, the coma of the eyepiece as a whole will be easy to correct. This means that the composite focal length of the first and second lens units is increased or, in other words, the composite refracting power of the first and second lens units is reduced. To put it another way, the correction of coma is achieved by reducing the Petzval's sum of the eyepiece as a whole by regulating the power distributed to the third, fourth and fifth lens units, thereby giving refracting powers to the first and second lens units in such a way that the power distribution of the eyepiece is not adversely affected. If there is a departure from the condition (1), the whole power distribution is greatly off balance and the balance of offaxial aberrations deteriorates.

When $f_3$ is let stand for the focal length of the third lens unit contributing greatly to the whole Petzval's sum, the following condition (2):

$$|f/f_3| < 1 \tag{2}$$

should be met, because it is then possible to reduce the Petzval's sum, thereby placing the whole aberrations in a well-balanced state.

Still other objects and advantages of the invention will in part be obvious and will in part be apparent from the specification.

The invention accordingly comprises the features of construction, combinations of elements, and arrangement of parts will be exemplified in the construction hereinafter set forth, and the scope of the invention will be indicated in the claims.

DESCRIPTION OF THE PREFERRED EMBODIMENTS

Figure 1:
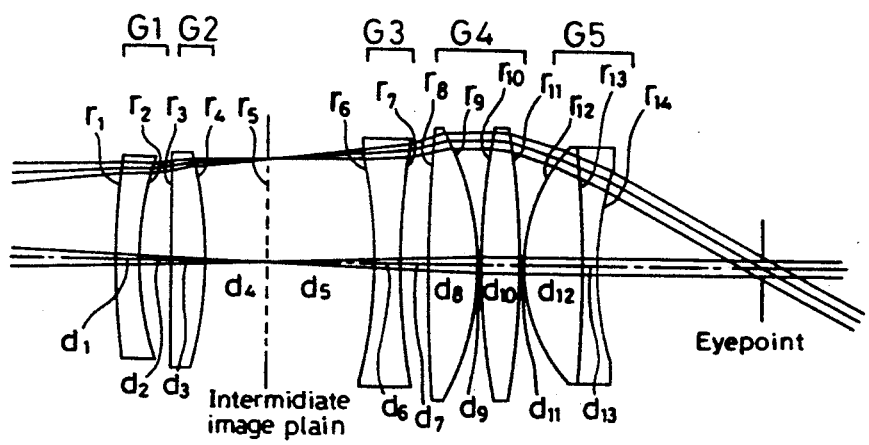
FIG. 1 represents in section a lens arrangement of Example 1 of the ultra-wide field eyepiece according to the invention.

In what follows, the invention will be explained with reference of Examples 1-2 of the ultra-wide field eyepiece for microscopes. The lens arrangement of Ex. 1, whose lens data will be given later, is illustrated in section in FIG. 1. It is noted that the arrangement of Ex. 2 is omitted from the accompanying drawings, because it is almost similar to that of Ex. 1.

In Example 1 or 2, the first lens unit G1 comprises one negative meniscus lens convex on the incident side, and the second lens unit G2 one positive meniscus lens convex on the eye side. The third lens unit G3 comprises one double-concave lens; the fourth lens unit G4 two double-convex lenses; and the fifth lens unit G5 a cemented lens of a double-convex lens with a double-concave lens, all located in the rear of an intermediate image plane.

The lens data of Examples 1 and 2 will be given just below. It is noted that several symbols referred to hereinafter but not hereinbefore stand for:

$r_1, r_2, \ldots$ the radii of curvature of the lens surfaces arranged in order from the incident side, $d_1, d_2, \ldots$ the spacings between the lens surfaces arranged in order from the incident side, $n_{d1}, n_{d2}, \ldots$ the d-line refractive indices of the lenses arranged in order from the incident side, and $\nu_{d1}, \nu_{d2}, \ldots$ the Abbe's numbers of the lenses arranged in order from the incident side.

Example 1
field number = 26.5, f = 25, $f_{12}$ = 375.4, $f_3$ = −51.6,
$|f/f_{12}|$ = 0.067, $|f/f_3|$ = 0.48

| | | | |
|---|---|---|---|
| $r_1$ = 97.2143 | $d_1$ = 3.0000 | $n_{d1}$ = 1.75520 | $\nu_{d1}$ = 27.51 |
| $r_2$ = 38.1555 | $d_2$ = 4.5000 | | |
| $r_3$ = −675.2436 | $d_3$ = 4.5000 | $n_{d2}$ = 1.75520 | $\nu_{d2}$ = 27.51 |
| $r_4$ = −51.9734 | $d_4$ = 8.0010 | | |
| $r_5$ = ∞ (intermediate image plain) | | | |
| | $d_5$ = 14.4967 | | |
| $r_6$ = −68.3048 | $d_6$ = 3.5000 | $n_{d3}$ = 1.75520 | $\nu_{d3}$ = 27.51 |
| $r_7$ = 92.8320 | $d_7$ = 3.8000 | | |
| $r_8$ = 258.5910 | $d_8$ = 6.7000 | $n_{d4}$ = 1.60311 | $\nu_{d4}$ = 60.70 |
| $r_9$ = −34.6242 | $d_9$ = 0.2000 | | |
| $r_{10}$ = 77.0584 | $d_{10}$ = 5.5000 | $n_{d5}$ = 1.69700 | $\nu_{d5}$ = 48.51 |
| $r_{11}$ = −90.5779 | $d_{11}$ = 0.1500 | | |
| $r_{12}$ = 22.9329 | $d_{12}$ = 7.8000 | $n_{d6}$ = 1.67790 | $\nu_{d6}$ = 55.33 |
| $r_{13}$ = −224.4094 | $d_{13}$ = 2.0000 | $n_{d7}$ = 1.84666 | $\nu_{d7}$ = 23.78 |
| $r_{14}$ = 39.6789 | | | |

Example 2
field number = 26.5, f = 25, $f_{12}$ = 300.7, $f_3$ = −45.9,
$|f/f_{12}|$ = 0.083, $|f/f_3|$ = 0.54

| | | | |
|---|---|---|---|
| $r_1$ = 69.0304 | $d_1$ = 6.9000 | $n_{d1}$ = 1.84666 | $\nu_{d1}$ = 23.78 |
| $r_2$ = 36.5646 | $d_2$ = 5.9000 | | |
| $r_3$ = −177.6991 | $d_3$ = 6.9000 | $n_{d2}$ = 1.84666 | $\nu_{d2}$ = 23.78 |
| $r_4$ = −50.2481 | $d_4$ = 8.0010 | | |
| $r_5$ = ∞ (intermediate image plain) | | | |
| | $d_5$ = 14.5000 | | |
| $r_6$ = −65.5582 | $d_6$ = 2.6000 | $n_{d3}$ = 1.84666 | $\nu_{d3}$ = 23.78 |
| $r_7$ = 97.1595 | $d_7$ = 4.3000 | | |
| $r_8$ = 327.7812 | $d_8$ = 6.7000 | $n_{d4}$ = 1.75500 | $\nu_{d4}$ = 52.33 |
| $r_9$ = −39.7932 | $d_9$ = 0.2000 | | |
| $r_{10}$ = 76.7099 | $d_{10}$ = 5.5000 | $n_{d5}$ = 1.81600 | $\nu_{d5}$ = 46.62 |
| $r_{11}$ = −129.2774 | $d_{11}$ = 0.1500 | | |
| $r_{12}$ = 25.6909 | $d_{12}$ = 7.8000 | $n_{d6}$ = 1.75500 | $\nu_{d6}$ = 52.33 |
| $r_{13}$ = −189.6563 | $d_{13}$ = 2.0000 | $n_{d7}$ = 1.84666 | $\nu_{d7}$ = 23.78 |
| $r_{14}$ = 39.6789 | | | |

Figure 2:
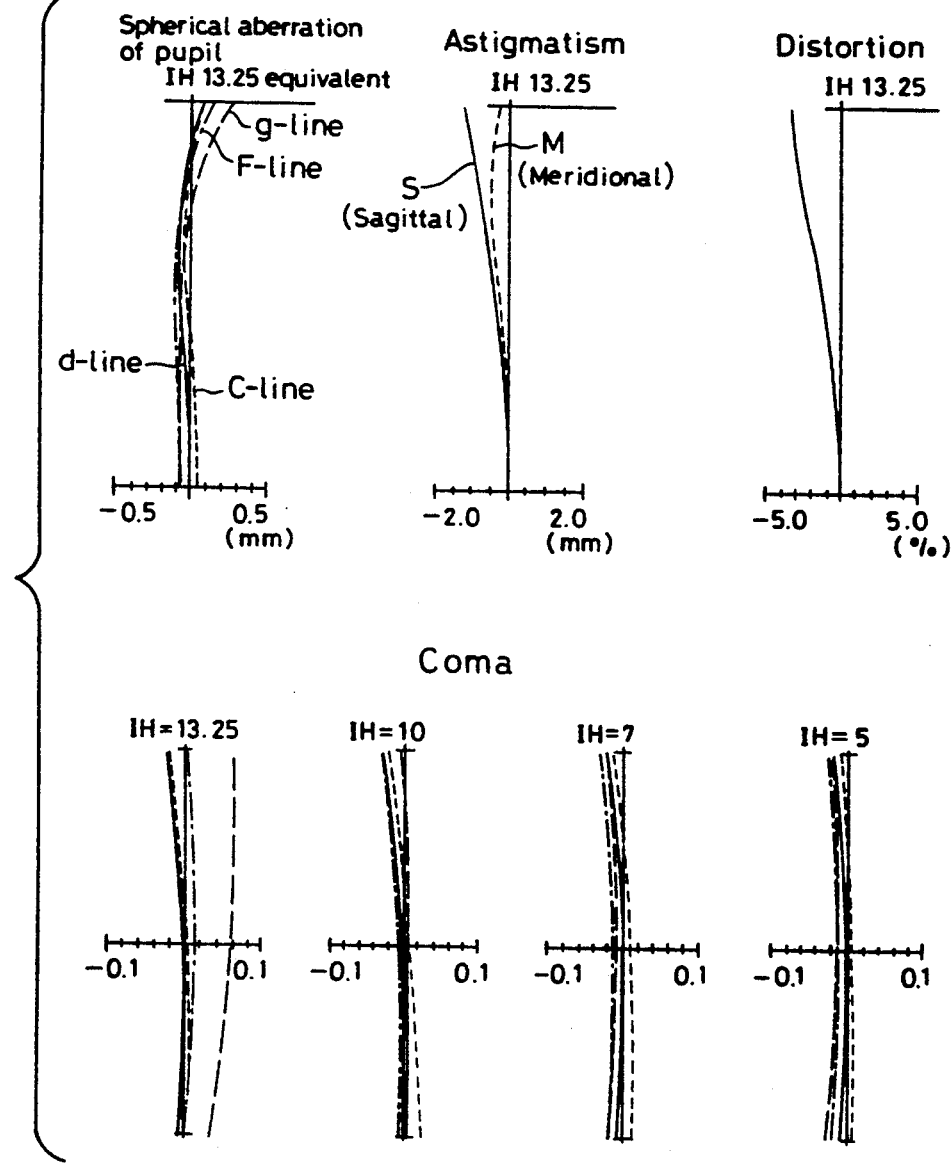
FIG. 2 represents aberration diagrams showing the spherical aberration, astigmatism, distortion and coma of the pupil, when the entrance pupil position of Example 1 lies at a position in front of and spaced 185-nm away from the first surface.
Figure 3:
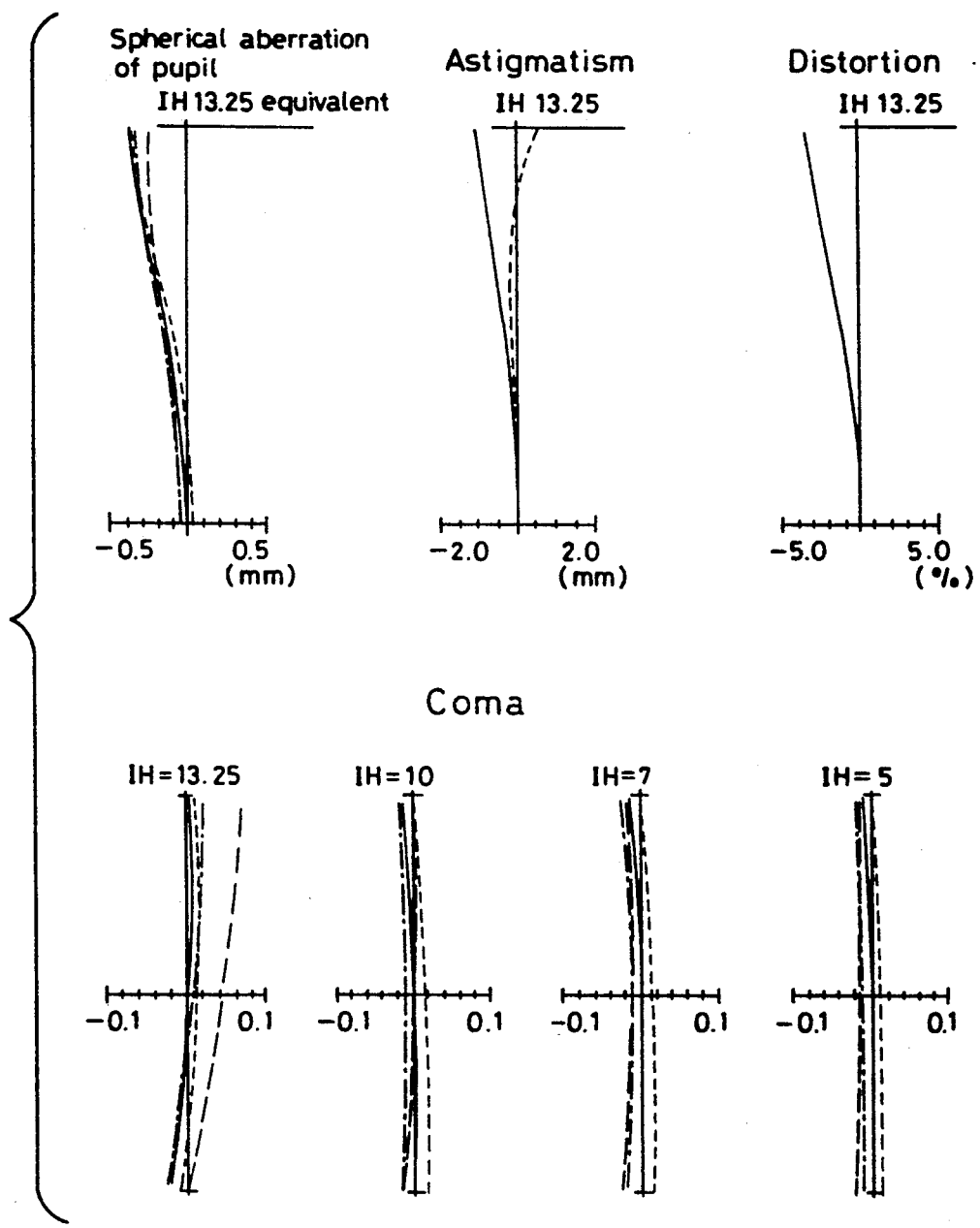
FIG. 3 represents aberration diagrams similar to those of FIG. 2, when the entrance pupil position of Example 1 lies at a position in front of and spaced 490-nm away from the first surface.
Figure 4:
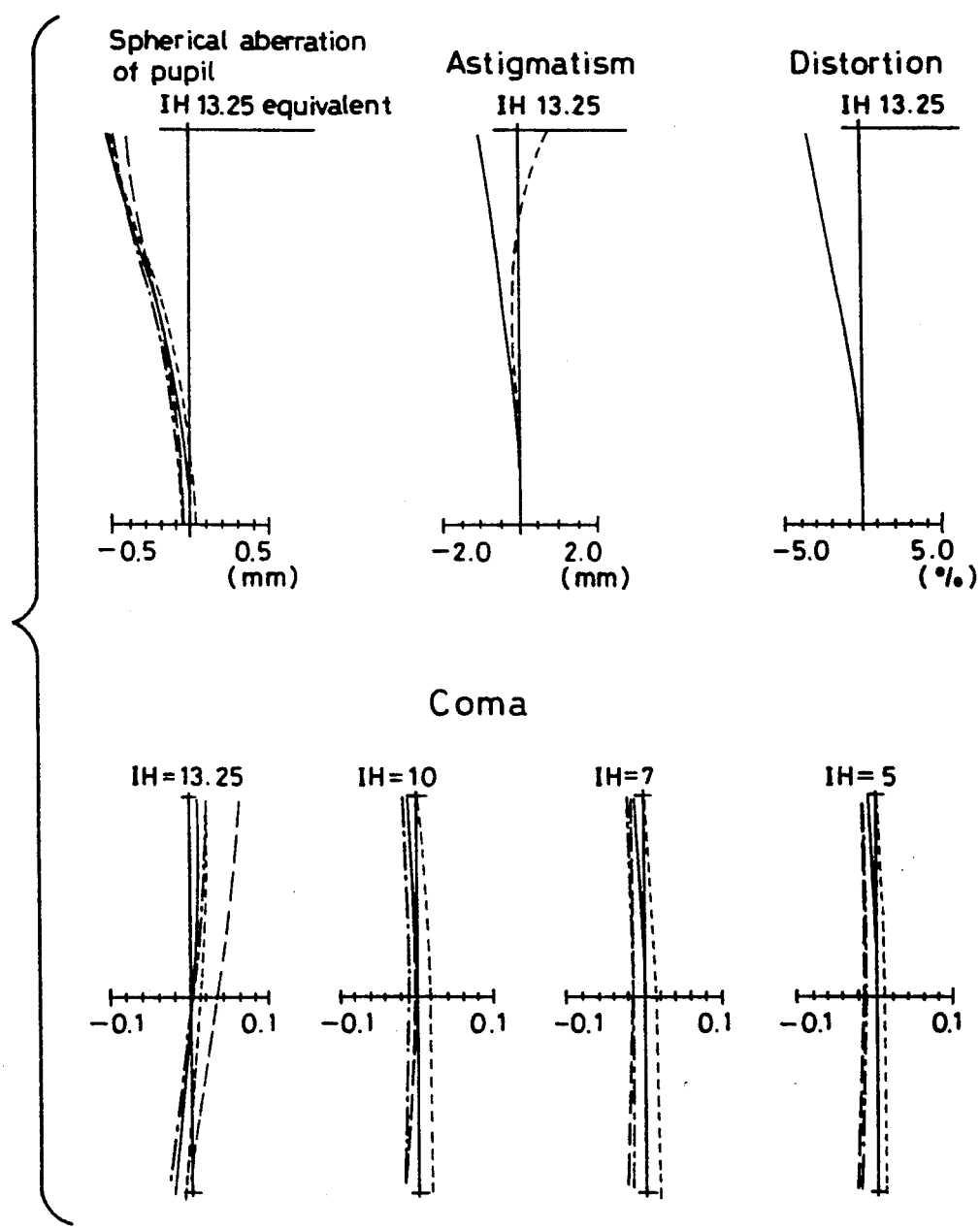
FIG. 4 represents aberration diagrams similar to those of FIG. 2, when the entrance pupil position of Example 1 lies at a position in front of and spaced 997-nm away from the first surface.
Figure 5:
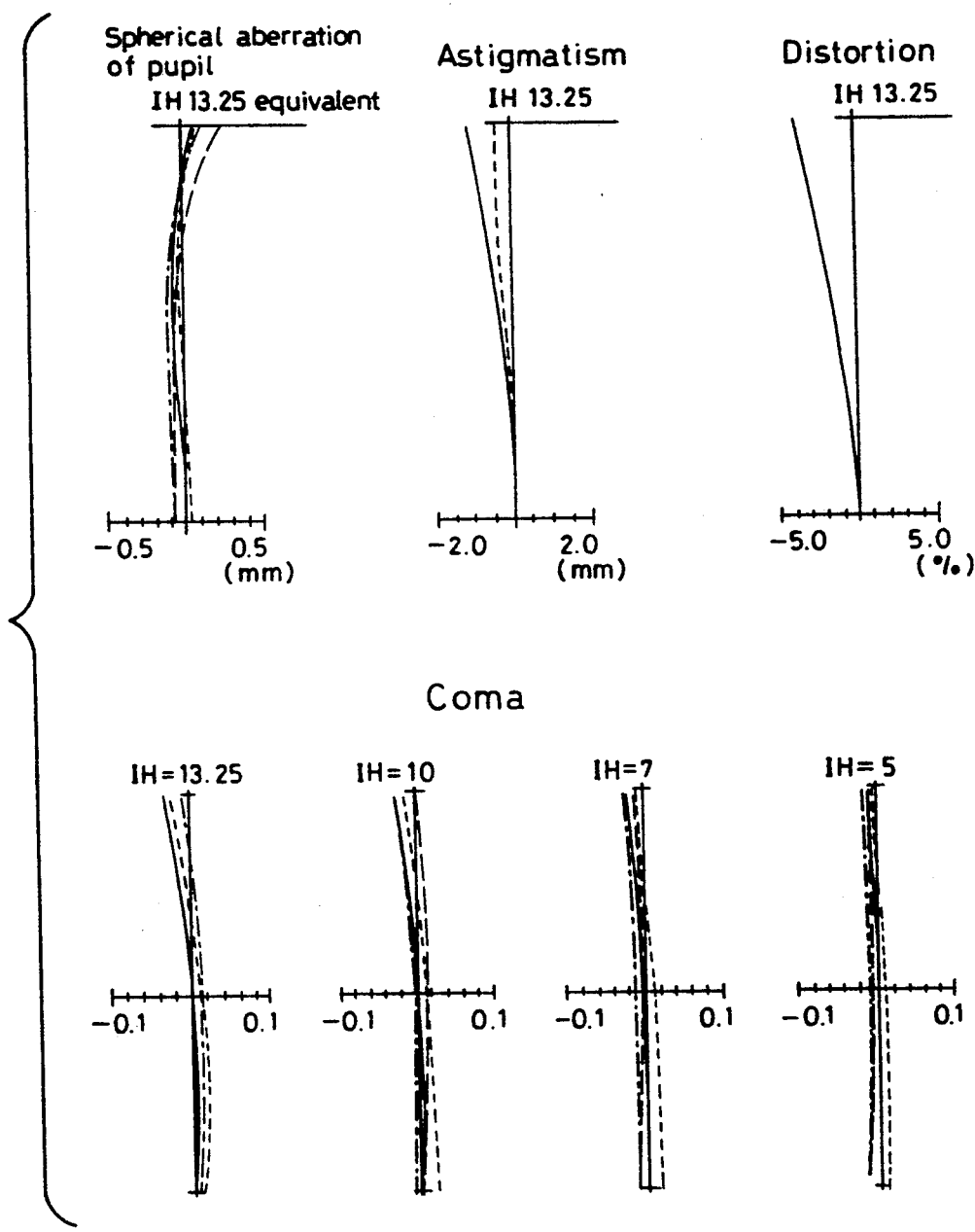
FIG. 5 represents aberration diagrams similar to those of FIG. 2, when the entrance pupil position of Example 2 lies at a position in front of and spaced 185-nm away from the first surface.
Figure 6:
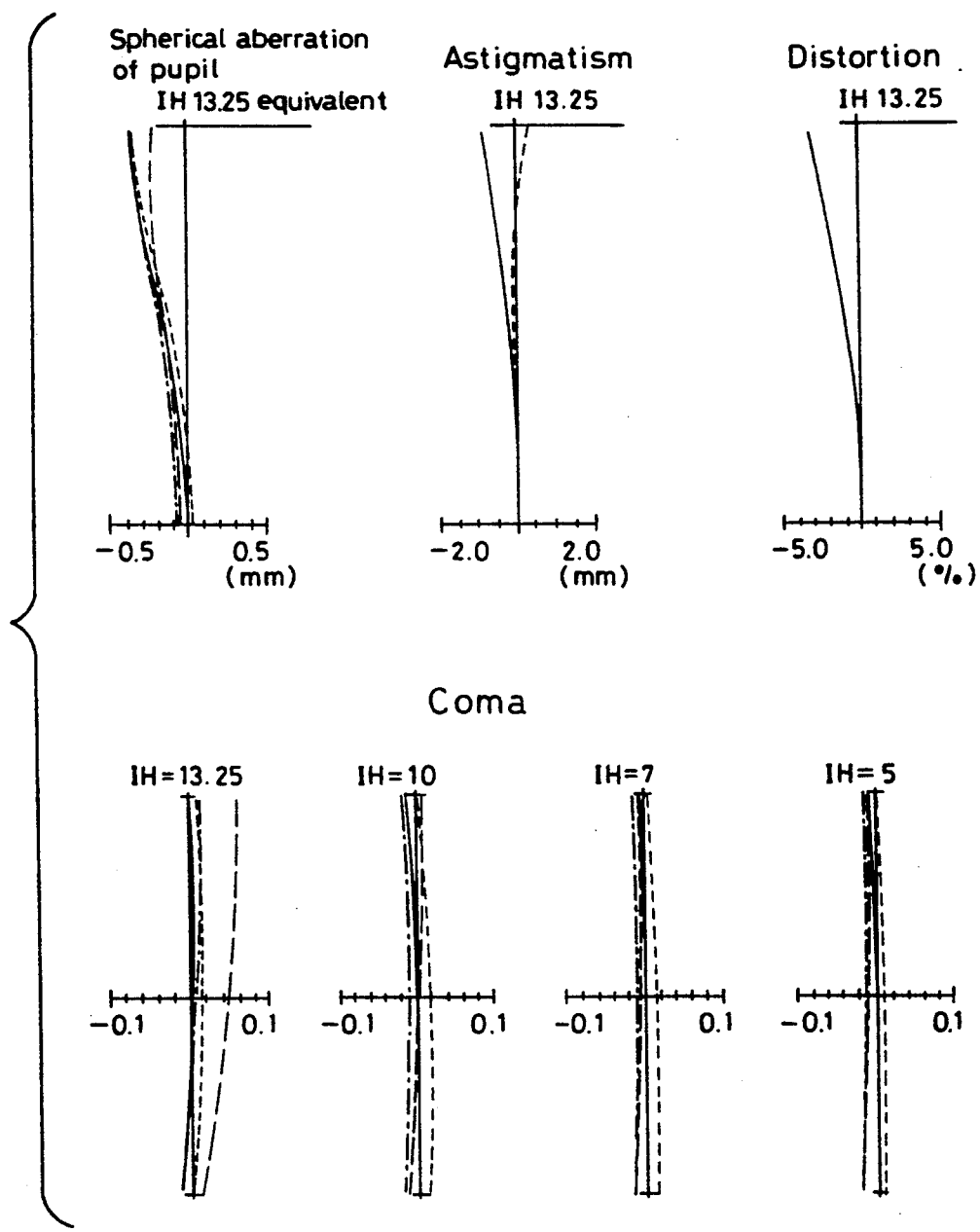
FIG. 6 represents aberration diagrams similar to those of FIG. 2, when the entrance pupil position of Example 2 lies at a position in front of and spaced 490-nm away from the first surface.
Figure 7:
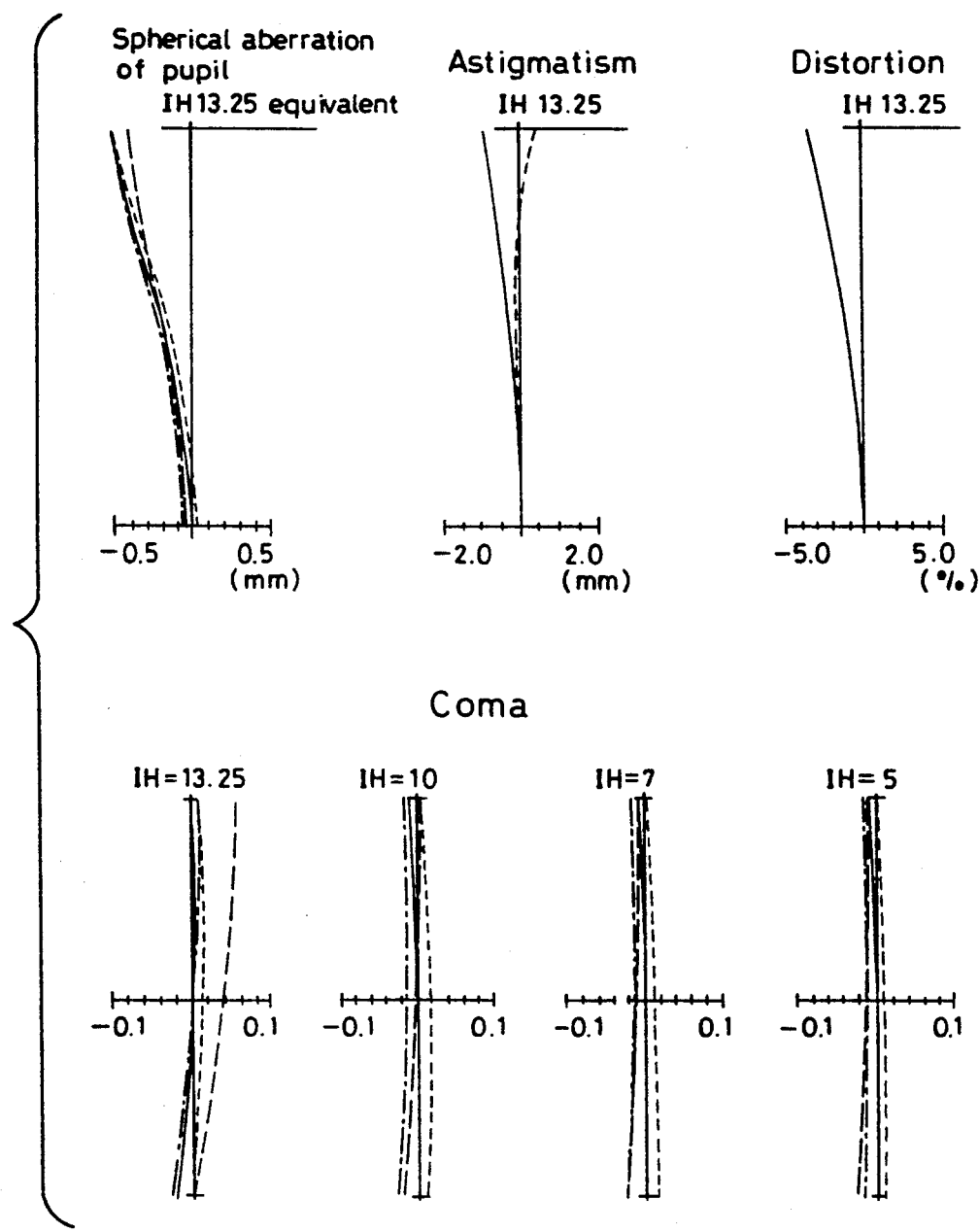
FIG. 7 represents aberration diagrams similar to those of FIG. 2, when the entrance pupil position of Example 2 lies at a position in front of and spaced 997-nm away from the first surface.

The aberration diagrams showing the spherical aberrations, astigmatisms, distortions and comae of the entrance pupils that are located at positions spaced 185-mm, 490-mm and 997-mm away from the first surface of the first lens unit G1 of Example 1 toward the object side, respectively, are shown in FIGS. 2–4. It is here noted that the spherical surface of the pupil is one at the eye position when ray tracing was performed from the object side and that the astigmatism, distortion and coma of the pupil are those when ray tracing was performed from the object side. FIGS. 5–7 are similar aberration diagrams for Example 2.

In both Examples 1 & 2, the whole aberrations are well corrected in a well-balanced state, even when the entrance pupil positions vary largely, as can be clearly seen from FIGS. 2–7.

As can be clearly noted from what has been described, the present invention provides an ultra-wide field eyepiece for microscopes, in which such off-axial aberrations as the curvature of field, astigmatism and coma are well-enough corrected in an ultra-wide field having a field number as large as 26.5, so that the image surface excels in flatness and the flatness of the image surface is most unlikely to degrade, even when the entrance position varies due to the objective lens, an intermediate tube lens, etc.

What we claim is:

1. An ultra-wide field eyepiece for microscopes comprising, in order from an entrance side to an exit side;

a first lens unit of negative power;
a second lens unit of positive power;
a third lens unit of negative power;
a fourth lens unit of positive power, and
a fifth lens unit of positive power with a surface facing the entrance side having a stronger curvature than a surface facing the exit side,
wherein between the first and second lens units, and on the entrance side of and on the exit side of the third lens unit there are spaces, and
wherein the third to fifth lens units are located on the exit side of an intermediate image plane.

2. An ultra-wide field eyepiece for microscopes as claimed in claim 1, wherein said first lens unit includes a negative meniscus lens which is convex on the entrance side.

3. An ultra-wide field eyepiece for microscopes as claimed in claim 1, wherein said second lens unit includes a positive lens which is convex on the exit side.

4. An ultra-wide field eyepiece for microscopes as claimed in claim 1, which further conforms to the following condition (1):

$$|f/f_{12}| < 0.3 \quad (1)$$

where f is the focal length of the eyepiece, and $f_{12}$ is the composite focal length of said first and second lens units.

5. An ultra-wide field eyepiece for microscopes as claimed in claim 4, which further conforms to the following condition (2):

$$|f/f_3| < 1 \quad (2)$$

where $f_3$ is the focal length of said third lens unit.

6. An ultra-wide field eyepiece for microscopes as claimed in claim 1, wherein said third lens unit is a negative lens in a double-concave form.

7. An ultra-wide field eyepiece for microscopes, which comprises, in order from an entrance side to an exit side;
a first lens that is a negative meniscus lens which is convex on the entrance side,
a second lens that is a positive lens which is convex on the exit side,
a third lens that is a double-concave lens,
fourth and fifth lenses that are positive lenses, and
a sixth lens that is a cemented doublet which is convex on the entrance side, and
wherein an intermediate image plane is located between said second lens and said third lens.

8. An ultra-wide field eyepiece for microscopes which includes, in order from an entrance side to an exit side;
a first lens unit of negative power,
a second lens unit of positive power which is located with a space between it and said first lens unit,
a third lens unit of negative power which is located adjacent to said second lens unit and with a space between it and said second lens unit,
a fourth lens unit of positive power, and
a fifth lens unit of positive power with a surface facing the entrance side having a stronger curvature than a surface facing the exit side, and
wherein said third to fifth lens units are located on the exit side of an intermediate image plane.

* * * * *